United States Patent Office 3,389,153
Patented June 18, 1968

1

3,389,153
3-ENOL ETHERS OF 17α-HALOETHYNYL-ESTRA 3,5(10),9(11)-TRIEN-17β-OLS
Lewis H. Sarett, Princeton and Thomas S. Bry, Linden, N.J., John Fried, Palo Alto, Calif., Arthur E. Oberster, North Canton, Ohio, and Roger E. Beyler, Carbondale, Ill., assignors to Merck & Co., Inc., Rahway, N.J., a corporation of New Jersey
No Drawing. Filed Aug. 13, 1965, Ser. No. 497,579
19 Claims. (Cl. 260—397.5)

ABSTRACT OF THE DISCLOSURE

17α-haloethynyl-estra-4,9(10)-diene-3-one-17β-ols are prepared by reacting a 3-derivatized estra-4,9(10)-diene-3,17-dione or estra-3,5(10),9(11)-trien - 17 - one with a haloethynylmagnesiumhalide.

---

This invention relates to steroid compounds and to processes for preparing them. More particularly, it relates to novel processes for preparing 17α-haloethynyl-17β-hydroxy-estra-4,9(10)-en-3-ones. These compounds are valuable as orally and parenterally active progestational agents.

Compounds prepared in accordance with the novel processes of this invention may be represented by the formula:

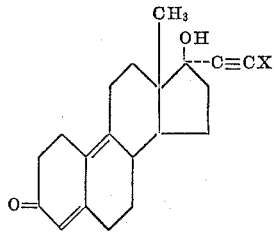

wherein X is chlorine or bromine.

2

In accordance with the invention, the above illustrated compounds are prepared by reaction between a metallic haloethyne and the corresponding 3,17-dioxo compound or a derivative thereof in which the 3-oxo function is protected by a readily removable group. The estradiene may be prepared, for example by reaction between pyridinium bromide, perbromide and the corresponding 5(10)-ene. A derivative, for example a ketal, enol ether or pyrrolidine derivative can be prepared, if desired, by reacting the 4,9(10)-diene with the appropriate derivatizing agent.

In this application, the term "metallic haloethyne" means compounds which generate bromoethynyl or chloroethynyl anions and includes, for example alkali metal and alkaline earth metal haloethynes such as sodium chloroacetylide and calcium chloroacetylide. It includes also Grignard reagents which produce the same haloethynyl anions, for example chloroethynyl magnesium bromide or bromoethynyl magnesium bromide. With Grignard reagents, it is preferred to practice this invention by using derivatives of estra-4,9(10)-diene-3,17-dione in which the 3-position is protected.

Processes within the scope of this invention can be schematically represented by the following sequences of reactions.

The sequence illustrates reaction between a metallic haloethyne, specifically sodium bromoacetylide and bromoethynyl magnesium bromide and estra-4,9(10)-diene-3,17-dione or a 3-oxo derivative thereof to produce the corresponding 17α-bromoethynyl-17β-hydroxy-estra-4,9(10)-dien-3-one or the corresponding 3-oxo derivative from which the desired compound is readily obtained by hydrolysis.

In accordance with the procedure of this invention in which the steroid reactant is unprotected at the 3-position, estra-4,9(10)-diene-3,17-dione is reacted with an alkali metal or alkaline earth metal chloro- or bromoacetylide in liquid ammonia. The nonsteroidal reactant is preferably used in excess to insure as complete utilization as possible

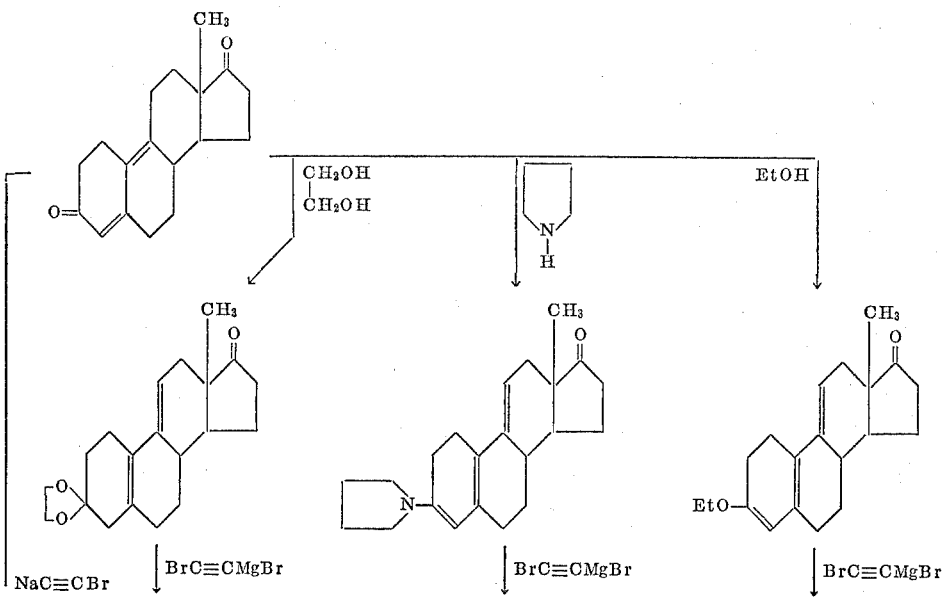

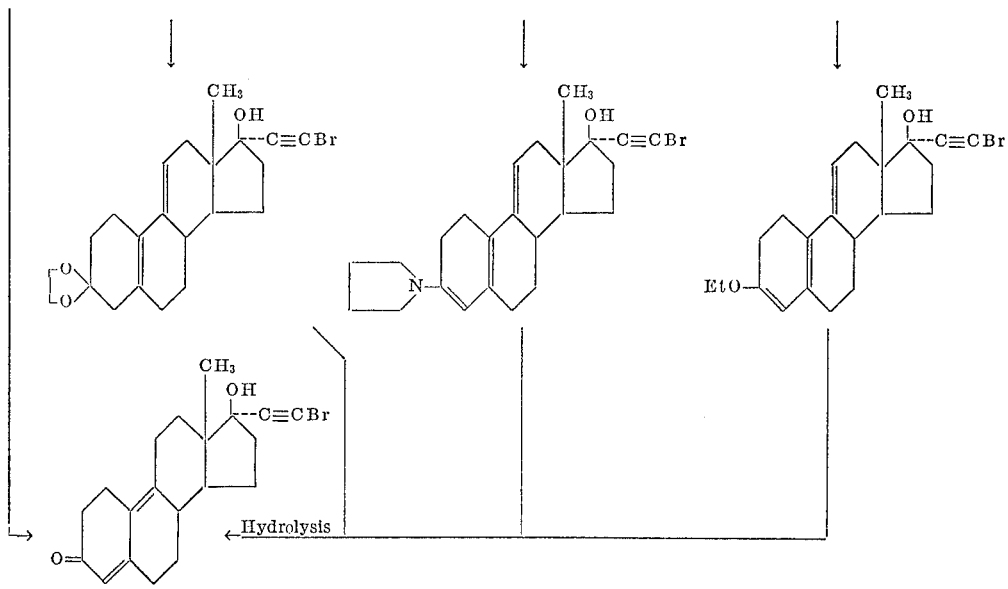

of the more expensive steroid. The time of reaction is not critical since even at the low temperature of from about −70° C. to about −40° C. the product forms almost immediately upon mixing the reactants.

The metallic haloacetylides are preferably prepared in the liquid ammonia. This may be effected by dissolving the metal in the liquid ammonia which may contain a trace quantity of an inorganic ferric salt such as ferric nitrate and thereafter, adding a solution of a 1,2-dihaloethylene, preferably in the cis form in a reaction inert organic solvent devoid of active hydrogens. The preferred solvents are lower ethers such as diethyl or di-n-butyl ether.

If a Grignard reagent is to be utilized in the practice of this invention, estra-4,9(10)-diene-3,17-dione is first protected at the 3-position by a readily removable protecting group. The steroid may, for example be converted to a 3-ketal derivative suitably a cyclic ketal such as a lower alkylenedioxy ketal, preferably ethylenedioxy. Alternatively, a lower enol ether such as the methoxy or ethoxy derivative can be employed. Still another derivative which is useful is the pyrrolidine derivative as illustrated above. These groups are readily removed by acid hydrolysis.

The selected derivative is reacted with the haloethynyl magnesium halide in a reaction inert organic solvent or solvent mixture, suitably an ether solvent such as diethyl or di-n-butyl ether or tetrahydrofuran. It is preferred to initiate reaction at a low temperature, e.g. about 0° C. to about 10° C. and then to allow the mixture to come to about 20° C. to about 30° C., preferably with stirring and to complete the reaction by allowing the mixture to stand for from about 5 to about 30 hours The protecting group at the 3-position is then removed, preferably by acid hydrolysis. Inorganic or organic acids may be employed and the solvent may be aqueous or non-aqueous. Hydrochloric acid in an aqueous alkanol such as methanol is convenient as are aromatic sulfonic acids in anhydrous ketones.

The compounds prepared by the processes of this invention are progestational agents and are useful in the treatment of various ailments requiring progestational hormone therapy. They may be administered alone, but most generally are employed in association with a pharmaceutical carrier, the choice of which will depend upon the properties of the active compound and standard pharmaceutical practice.

The following examples are given by way of illustration only and are not intended as limitations of this invention, many apparent variations of which are possible without departing from the spirit and scope thereof.

Example 1

A mixture of 2.5 g. of cis 1,2-dichloroethylene in 5 ml. of absolute ether is added at about −60° C. over 15 minutes to 25 ml. of liquid ammonia containing a trace of ferric nitrate and 11.6 g. of dissolved sodium. While maintaining the temperature between −60° C and −70° C. a total of 6.5 g. of estra-4,9(10)-diene-3,17-dione in 30 ml. of ether is added. The mixture is then allowed to come to ambient temperature and held for about 16 hours while the ammonia evaporates. The residue is diluted with water, filtered and the filtrate evaporated with benzene. The benzene extract is dried over anhydrous sodium sulfate, filtered, and concentrated in vacuo. The desired product 17α - chloroethynyl-17β-hydroxy-estra-4,9(10)-dien-3-one is isolated and purified by chromatography on acid-washed alumina using ether-petroleum ether solvents.

The same product is prepared by the foregoing procedure, but with the substitution of an equivalent amount of potassium or calcium for the sodium.

The compound 17α-bromoethynyl-17β-hydroxy-estra-4,9(10)-dien-3-one is similarly prepared by any of the foregoing procedures but utilizing cis or trans 1,2-dibromoethylene.

Example 2

To a solution of 1 g. of estra-4,9(10)-diene-3,17-dione in 75 ml. of benzene is added 7.5 ml. of ethylene glycol, together with 50 mg. of p-toluene sulfonic acid. The reaction mixture is heated at reflux with a water separator for 20 hours. The reaction mixture is cooled and aqueous sodium bicarbonate solution added. The reaction mixture is extracted with ether and the combined extracts washed with water, dried over sodium sulfate and evaporated to dryness to give 3-ethylenedioxy-estra-5(10),9(11)-dien-17-one.

Example 3

A mixture of 1 g. of estra-4,9(10)-diene-3,17-dione, 100 mg. of p-toluene sulfonic acid monohydrate and 20 ml. of 2-ethyl-2-methyl-1,3-dioxolane are heated, and the liberated butanone, admixed with the reactant dioxolane distilled slowly through a small Claisen-Vigreux column at atmospheric pressure for 5 hours. The cooled reaction mixture is diluted with benzene, washed successively with 5% aqueous sodium bicarbonate and with water, dried over sodium sulfate and concentrated to dryness. Crystallization gives 3-ethylenedioxy-estra(5(10),9(11)-dien-17-one Example 4

A total of 3 ml. of pyrrolidine is added to a solution of 2.7 g. of estra-4,9(10)-diene-3,17-dione in 30 ml. of methanol. The solution is refluxed under nitrogen for one hour. The solution is concentrated in vacuo with the substantial exclusion of moisture. The product crystallizes on cooling and is recrystallized to give substantially pure 3-(N-pyrrolidyl)-estra-3,5(10),9(11)-trien-17-one.

Example 5

To a solution of 100 mg. of estra-4,9(10)-diene-3,17-dione in 3 ml. of dioxane is added 2 ml. of ethyl orthoformate and 10 mg. of 2,4-dinitrobenzene sulfonic acid. The reaction mixture is stirred at room temperature for 3 hours and 1 ml. of pyridine is added, followed by the dropwise addition of 5 ml. of water. The aqueous phase is separated and extracted with benzene. The organic extracts are washed with aqueous sodium bicarbonate and then with water until the washings are neutral. The organic phase is separated, dried over anhydrous sodium sulfate, filtered and concentrated in vacuo to give 3-ethoxy-estra-3,5(10),9(11)-trien-17-one.

Example 6

A total of 4.2 g. of 3-ethoxy-estra-3,5(10),9(11)-trien-17-one in 14 ml. of tetrahydrofuran is added to a solution of excess chloroethynyl magnesium bromide in cold tetrahydrofuran. The mixture is allowed to come to room temperature and stirred for 16 hours. The resulting complex is decomposed with saturated aqueous ammonium chloride solution. The mixture is then saturated with sodium chloride and extracted with benzene. The benzene extract is dried over sodium sulfate, filtered and concentrated in vacuo. The concentrate is chromatographed on silica gel and eluted with ether/petroleum ether mixtures to give 3-ethoxy-17α-chlorethynyl - estra - 3,5(10),9(11)-trien-17β-ol.

This procedure is used to prepare the following compounds:

3-ethylenedioxy-17α-chloroethynyl-estra-5(10),9(11)-dien-17β-ol;
3-(N-pyrrolidyl)-17α-chloroethynyl-estra-5(10),9(11)-dien-17β-ol;
3-ethoxy-17α-bromoethylnyl-estra-5(10),9(11)-dien-17β-ol;
3-ethylenedioxy-17α-bromoethynyl-estra-5(10),9(11)-dien-17β-ol;
3-(N-pyrrolidyl)-17α-bromoethynyl-estra-5(10),9(11)-dien-17β-ol.

The starting compounds utilized are those prepared in Examples 2, 3 and 4. For the preparation of the bromoethynyl compounds, the chloroethynyl magnesium compound is replaced with the corresponding bromoethynyl compound.

Example 7

A solution of 10 mg. of 3-ethoxy-17α-chloroethynyl-estra-3,5(10),9(11)-trien-17β-ol and 2 mg. of p-toluene sulfonic acid in 2 ml. of acetone is left standing at about 25° C. for about 16 hours. The reaction mixture is then poured into ice water and extracted with ether. The ether extract is washed with aqueous sodium bicarbonate, dried over sodium sulfate, filtered and concentrated in vacuo to yield 17α-chloroethynyl-17β-hydroxy-estra-4,9(10)-dien-3-one which is purified by recrystallization.

The compound 17α-bromoethynyl-17β-hydroxy-estra-4,9(10)-dien-3-one is similarly prepared from the corresponding bromoethynyl compound.

Example 8

A total of 1 g. of 3-ethylenedioxy-17α-chloroethynyl-estra-5(10),9(11)-dien-17β-ol is dissolved in 50 ml. of anhydrous acetone, 50 mg. of p-toluene sulfonic acid monohydrate added and the mixture allowed to stand at about 25° C. for about 16 hours. The resultant solution is concentrated in vacuo. The compound 17α-chloroethynyl-17β-hydroxy-estra-4,9(10)-dien-3 - one is precipitated by the addition of water. It may be recovered by filtration and purified by recrystallization.

The compound 17α-bromoethynyl-17β-hydroxy-estra-4,9(10)-dien-3-one is similarly prepared from the corresponding bromoethynyl compound.

Example 9

A total of 500 mg. of 3-(N-pyrrolidyl)-17α-chloroethynyl-estra-3,5(10),9(11)-trien-17β-ol is refluxed for 4 hours in a buffered solution of 1.5 g. of sodium acetate, 1.5 ml. of water and 1 ml. of glacial acetic acid in 10 ml. of methanol. The mixture is poured onto an ice/sodium bicarbonate solution and extracted with benzene. The benzene extract is washed with water, dried over anhydrous sodium sulfate, filtered and concentrated in vacuo to give 17α-chloroethynyl-17β-hydroxy-estra-4,9(10)-dien-3 - one as a residue. The product may be purified by recrystallization.

The compound 17α-bromoethynyl-17β-hydroxy-estra-4,9(10)-dien-3-one is similarly prepared from the corresponding bromoethynyl compound.

We claim:
1. A process for the preparation of a 17α-haloethynyl-estra-4,9(10)-diene-3-one-17β-ol which comprises reacting a 3-derivatized estra-4,9(10)-diene-3,17-dione with a haloethynyl magnesium halide and hydrolyzing resulting compound.

2. A process for the preparation of a 17α-haloethynyl-estra-4,9(10)-diene-3-one-17β-ol which comprises reacting 3-ethylenedioxy-estra-5(10),9(11)-dien-17 - one with a haloethynyl magnesium halide and hydrolyzing resulting compound.

3. A process for the preparation of a 17α-bromoethynyl-estra-4,9(10)-diene-3 - one - 17β - ol which comprises reacting 3-ethylenedioxy-estra-5(10),9(11)-dien-17 - one with a bromoethynyl magnesium bromide and hydrolyzing resulting compound.

4. A process for the preparation of a 17α-chloroethynyl-estra-4,9(10)-diene-3-one-17β-ol which comprises reacting 3-ethylenedioxy-estra-5(10),9(11) - dien - 17 - one with a chloroethynyl magnesium bromide and hydrolyzing resulting compound.

5. A process for the peraparation of a 17α-haloethynyl-estra-4,9(10)-diene-3-one-17β-ol which comprises reacting a 3-enol ether-estra-3,5(10),9(11)-trien-17-one with a haloethynyl magnesium halide and hydrolyzing resulting compound.

6. A process for the preparation of a 17α-bromoethynyl-estra-4,9(10)-diene-3-one-17β-ol which comprises reacting a 3-enol ether-estra-3,5(10),9(11)-trien-17-one with a bromoethynyl magnesium bromide and hydrolyzing resulting compound.

7. A process for the preparation of a 17α-chloroethynyl-estra-4,9(10)-diene-3-one-17β-ol which comprises reacting a 3-enol ether-estra-3,5(10),9(11)-trien-17-one with a chloroethynyl magnesium bromide and hydrolyzing resulting compound.

8. A process for the preparation of a 17α-haloethynyl-estra-4,9(10)-diene-3-one-17β-ol which comprises reacting a 3-ethoxy-estra-3,5(10),9(11)-trien-17-one with a haloethynyl magnesium halide and hydrolyzing resulting compound.

9. A process for the preparation of a 17α-bromoethynyl-estra-4,9(10)-diene-3-one-17β-ol which comprises reacting a 3-ethoxy-estra-3,5(10),9(11)-trien-17-one with a bromoethynyl magnesium bromide and hydrolyzing resulting compound.

10. A process for the preparation of a 17α-chloroethynyl-estra-4,9(10)-diene-3-one-17β-ol which comprises reacting a 3-ethoxy-estra-3,5(10),9(11)-trien-17-one with a chloroethynyl magnesium, bromide and hydrolyzing resulting compound.

11. A process for the preparation of a 17α-haloethynyl-estra-4,9(10)-diene-3-one-17β-ol which comprises reacting a 3-(N-pyrrolidyl)-estra-3,5(10),9(11)-trien-17-one with a haloethynyl magnesium halide and hydrolyzing resulting compound.

12. A process for the preparation of a 17α-bromoethynyl-estra-4,9(10)-diene-3-one-17β-ol which comprises reacting a 3-(N-pyrrolidyl)-estra-3,5(10),9(11)-trien-17-one with a bromoethynyl magnesium bromide.

13. A process for the preparation of a 17α-chloroethynyl-estra-4,9(10)-diene-3-one-17β-ol which comprises reacting a 3-(N-pyrrolidyl)-estra-3,5(10),9(11)-trien-17-one with a chloroethynyl magnesium bromide.

14. 3-enol ethers of 17α-haloethynyl-estra-3,5(10,9(11)-trien-17β-ols.

15. 3-alkoxy ethers of 17α-haloethynyl-estra-3,5(10),9(11)-trien-17β-ols.

16. 3-benzyloxy ethers of 17α-haloethynyl-estra-3,5(10),9(11)-trien-17β-ols.

17. A 3-ethoxy-17α-haloethynyl-estra-3,5(10),9(11)-trien-17β-ol.

18. 3-ethoxy-17α-chloroethynyl-estra-3,5(10),9(11)-trien-17β-ol.

19. 3-ethoxy-17α-bromoethynyl-estra-3,5(10),9(11)-trien-17β-ol.

References Cited

UNITED STATES PATENTS

| | | | |
|---|---|---|---|
| 3,069,421 | 12/1962 | Nomine et al. | 260—239.55 |
| 3,118,919 | 1/1964 | Brown et al. | 260—397.45 |
| 3,282,785 | 11/1966 | Joly et al. | 167—65 |

OTHER REFERENCES

Burgess et al.: Journal Chemical Soc. (1962), pp. 4995–5004.

ELBERT L. ROBERTS, *Primary Examiner.*